United States Patent [19]
Rowland et al.

[11] Patent Number: 6,074,100
[45] Date of Patent: Jun. 13, 2000

[54] FIBER OPTIC TERMINUS AND MANUFACTURING METHOD THEREFOR

[75] Inventors: Mark W. Rowland, Hamden, Conn.; Louis M. Marchitto, Otis, Mass.; Robert H. Rohloff, Bethany; James A. Alston, Woodbridge, both of Conn.

[73] Assignee: Sikorsky Aircraft Corporation, Stratford, Conn.

[21] Appl. No.: 09/126,515

[22] Filed: Jul. 30, 1998

[51] Int. Cl.[7] .................................................. G02B 6/36
[52] U.S. Cl. ............................... 385/78; 385/85; 385/77; 385/72; 385/60
[58] Field of Search ............................ 385/78, 77, 76, 385/72, 70, 60, 56, 53, 85

[56] References Cited

U.S. PATENT DOCUMENTS

| | | | |
|---|---|---|---|
| 4,784,699 | 11/1988 | Moulin | 385/78 |
| 5,636,310 | 6/1997 | Walles | 385/139 |
| 5,687,269 | 11/1997 | Furuya et al. | 385/85 |
| 5,694,507 | 12/1997 | Walles | 385/72 |

Primary Examiner—Phan T. H. Palmer
Attorney, Agent, or Firm—Brian A. Collins

[57] ABSTRACT

A fiber optic terminus (10) for use in fiber optic cable connections which terminus (10) includes an optical fiber (12) disposed within and supported by a ferrule (24). The fiber optic terminus (10) is characterized by a terminus end profile (50) wherein the end surface (52) of the optical fiber (12) is recessed or undercut relative to face surface (28) of the ferrule (24). In another embodiment of the invention, the face surface (28) of the ferrule (24) defines a surface angle φ which is less than about 2.0 degrees to minimize transmission losses when termini are assembled in opposed relation. The fiber optic terminus (10) is fabricated by stripping a fiber optic cable (8) to expose the optical fiber (12), bonding the stripped-end of the fiber optic cable (8) to the ferrule (24), cleaving the optical fiber (12) in closed proximity to the face surface (28) of the ferrule (28), polishing the cleaved-end of the optical fiber (12) to achieve the terminus end profile (50) and inspecting the polished-end of the optical fiber (12) to determine whether the terminus end profile (50) conforms to predefined acceptance criteria.

30 Claims, 5 Drawing Sheets

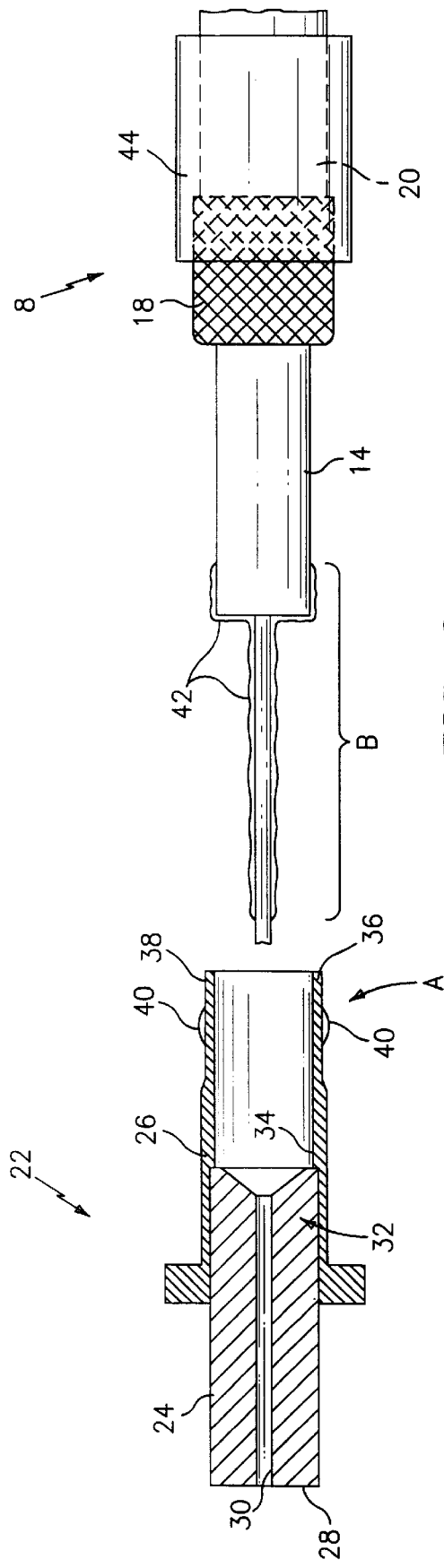
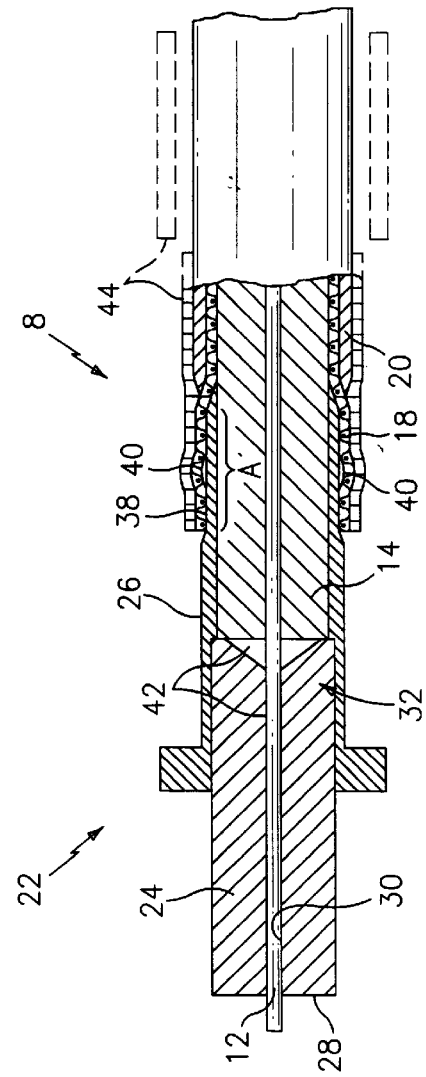
FIG. 3
FIG. 4

FIBER OPTIC TERMINUS AND MANUFACTURING METHOD THEREFOR

RELATED APPLICATION

This invention is related to a co-pending, commonly-owned, U.S. patent application Ser. No. 09/126,834 entitled "Bonding Operation for Fabricating Fiber Optic Terminus".

TECHNICAL FIELD

This invention is directed to fiber optic cabling, and, more particularly, to a terminus configuration therefor which is less susceptible to damage or degradation in a demanding operational environment, e.g., vibration prone environment. Furthermore, a manufacturing method, inspection technique, and acceptance criteria are disclosed for determining the efficacy of the fiber optic terminus.

BACKGROUND OF THE INVENTION

Fiber optics are increasing being utilized for communicating wide band widths of data at high data transmission rates. Based upon the material and labor costs associated with producing a fiber optic simplex cable, the use of fiber optics typically becomes cost efficient (i.e., as compared to conventional metallic cable) when the data rates exceed about 100,000 bits per second (bps). Today, the applications for fiber optics are typically limited to telecommunications, cable television, and highly advanced aircraft/spacecraft. With respect to the latter, fiber optics are used extensively in the Boeing/Sikorsky RAH-66 Comanche rotorcraft, the Lockheed Martin/Boeing F-22 fighter aircraft, and NASA's space station "Freedom". Of course, as the manufacturing methods become automated and material costs diminish, the use of fiber optics will become more attractive even for less demanding data communications applications e.g., the automobile industry.

The principle advantages of fiber optics include weight, material cost, and size when compared to a conventional twisted-shielded pair of copper wires. Firstly, for the same "data-carrying capacity", a fiber optic simplex cable weights about 0.0003% of the weight of a conventional twisted-shielded pair. For example, a ten-foot length of fiber optic cable having the capacity to transmit data at a rate of about 5×108 bps, weights about 0.009 kg. as compared to about 30.0 kg. for a copper wire bundle having the same data carrying capacity. Similarly, the material cost of the described ten-foot segment is about 0.07% of the cost associated with the comparable length of twist-shielded pairs. Moreover, the bundle diameter measures approximately 0.1586 cm. for the fiber optic cable verses about 12.7 cm. for the segment of twisted shielded pairs.

Yet additional advantages, particularly important to the aerospace industry, include protection against Electro-Magnetic Interference (EMI) and potential fire hazards. With respect to the former, conventional copper wiring used in aircraft is heavily shielded for preventing electromagnetic interference or "cross-talk" between systems. It will be appreciated that such protection is particularly important for aircraft flight critical systems, e.g., an Automatic Flight Control System (AFCS), wherein cross-talk between systems may introduce stray signals into the one of the flight critical systems. Fiber optic filaments, in contrast, are not electrically conductive, and, consequently, are immune to EMI. With respect to the latter, the electrical connections associated with conventional copper wiring can produce arcing, and, consequently, a spark which can be a potential fire hazard. It will be appreciated that in an aircraft carrying about 30% of its weight in jet fuel, the electrical connections must be highly protected/insulated and, preferably, positioned distally of fuel tanks/fuel lines. Fiber optic connections, in contrast, do not produce arcing, and, consequently, cannot become a source of ignition.

Despite the numerous advantages of fiber optics, several drawbacks persist with respect to the ruggedness/reliability of the fiber optic cable/termini, particularly when adapting fiber optics to a demanding operational environment. That is, it will be appreciated that the optical fiber employed in such cables is extremely delicate and prone to damage, especially when adapted for use in a high vibration and/or high temperature environment. For example, vibratory stresses can cause a minor imperfection, i.e., a small crack, introduced in the manufacturing process to propagate within the optical fiber and cause premature failure of the fiber optic cable. It will be appreciated that even small cracks in the optical fiber can seriously degrade or entirely defeat the transmission of data communication signals. Furthermore, elevated temperatures during the manufacturing process or, in its operational environment, can introduce thermal stresses in the optical fiber, which, similarly, can become the source of imperfections and failure of the optic fiber.

A need, therefore, exists to provide a fiber optic cable/terminus which is less susceptible to damage or signal degradation when adapted for use in a demanding operational environment, e.g., a high vibration and/or high temperature environment.

SUMMARY OF THE INVENTION

It is an object of the present invention to provide fiber optic terminus for use in fiber optic cable connectors which terminus defines a terminus end profile which is less susceptible to damage or signal degradation when adapted for use in a demanding operational environment.

It is another object of the present invention to provide a manufacturing method for making such a fiber optic terminus.

It is another object of the present invention to provide an inspection method for determining the efficacy of the fiber optic terminus.

These and other objects are achieved by a fiber optic terminus having an optical fiber disposed within and surrounded by a ferrule. The fiber optic terminus is characterized by a terminus end profile wherein the end surface of the optical fiber is recessed or undercut relative to face surface of the ferrule. More specifically, the face surface of the ferrule assembly defines a theoretical plane which is not intersected by any point defined by the end surface of the optical fiber. In another embodiment of the invention, the face surface of the ferrule defines a surface angle which is less than about 2.0 degrees to minimize transmission losses when a pair of termini are assembled in opposed relation.

The fiber optic terminus is fabricated by stripping a fiber optic cable to expose the optical fiber, bonding the stripped-end of the fiber optic cable to the ferrule, cleaving the optical fiber in closed proximity to the face surface of the ferrule, polishing the cleaved-end of the optical fiber to achieve the terminus end profile, and inspecting the polished-end of the optical fiber to determine whether the terminus end profile conforms to predefined acceptance criteria. In one embodiment of the invention, the polishing step is characterized by: polishing the ferrule and the optical fiber utilizing a course polishing film comprising a soft polishing material, polishing the ferrule and the optical fiber utilizing a fine polishing film having a hard polishing, and polishing the ferrule and the optical fiber utilizing an ultra-fine polishing film having a soft polishing material. Preferably, the various polishing films are backed by a rigid substructure to achieve the desired terminus end profile.

In yet another embodiment of the method, the inspection step is characterized by: examining said terminus end profile using a microscope to detect imperfections in the optical fiber, and examining the terminus end profile using an incident-light interference device. In the preferred embodiment, a white-light interference device is used to examine the terminus end profile.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 3 depicts the stripped end of the fiber optic cable in preparation for bonding to a ferrule assembly;

FIG. 4 depicts the integrated fiber optic cable/ferrule assembly subsequent to the bonding operation;

FIG. 5b depicts an end view of the terminus end profile of FIG. 5a;

BEST MODE FOR CARRYING OUT THE INVENTION

Figure 1:
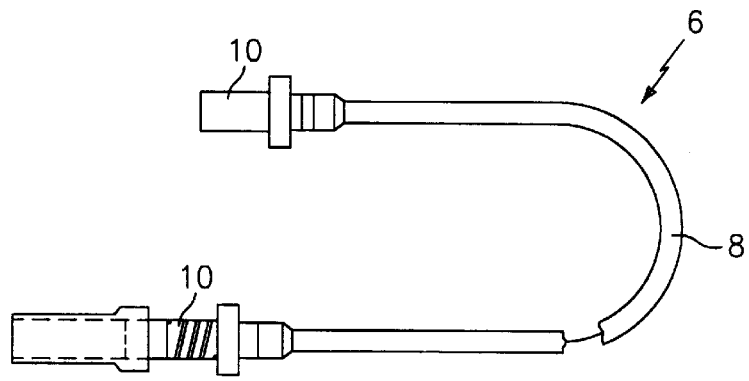
FIG. 1 depicts a fiber optic simplex cable employing a fiber optic terminus according to the present invention.

Referring now to the drawings wherein like reference characters identify corresponding or similar elements throughout the several views, FIG. 1 shows a fiber optic simplex cable assembly 6 comprising a fiber optic cable 8 and a fiber optic terminus 10 according to the present invention disposed at the each end thereof. Such termini 10 are used to produce the fiber optic connections between pairs of simplex cables 6 and are typically aligned end-to-end or face-to-face by means of a conventional pin and socket arrangement. In the context used herein, a "fiber optic terminus" means at least the combination of an optic fiber or filament disposed within and supported by any hard/rigid structure useful for protecting the tip end of the optical fiber (such structure will hereinafter be referred to as a "ferrule" or "ferrule assembly"). As will be discussed in greater detail below, each terminus 10 is manufactured and assembled to highly precise specifications to optimize the spectral transmission across the fiber optic connection, i.e., minimize loss. For aerospace applications, the acceptable loss across a fiber optic connection is typically less than about 1.0 decibels.

The manufacturing method for producing the inventive fiber optic terminus 10 involves several critical steps which will be illustrated and described below. While the fiber optic terminus 10 will be described and illustrated in the context of a "pin" terminus, it should be understood that the inventive teachings are equally applicable to "socket" terminus or other terminus configurations. The steps involved in the manufacture of any epoxy-style fiber optic terminus include: stripping the fiber optic cable to expose various internal elements of the cable, bonding the cable to a ferrule assembly, cleaving and polishing the end face of the optical fiber such that it is substantially co-planar with the face surface of the ferrule assembly, and inspecting the end face of the optic fiber for imperfections. In one embodiment of the present invention, the bonding operation is characterized by solidifying the bonding adhesive about an inboard end portion of the ferrule assembly and, subsequently, fully curing the bonding adhesive in the terminus. Preferably, the final cure operation is performed by a multi-stage cure cycle or a "stepped-cure" operation. In another embodiment of the invention, the polishing process comprises the use of hard and soft polishing films having a select particulate size, e.g., course, intermediate, and fine, to produce a preferred terminus end profile. The preferred terminus end profile is defined in relation to the face surface of the ferrule assembly and is characterized by the optical fiber defining an end face which is undercut relative to the face surface of the ferrule assembly. In yet another embodiment of the invention, a white light interferometer in combination with a preprogrammed software routine is used to characterize the entire surface of the end profile and to determine whether the end profile conforms to predefined acceptance criteria. The import of these features of the invention with be described in subsequent paragraphs.

STRIPPING OPERATION

Figure 2:
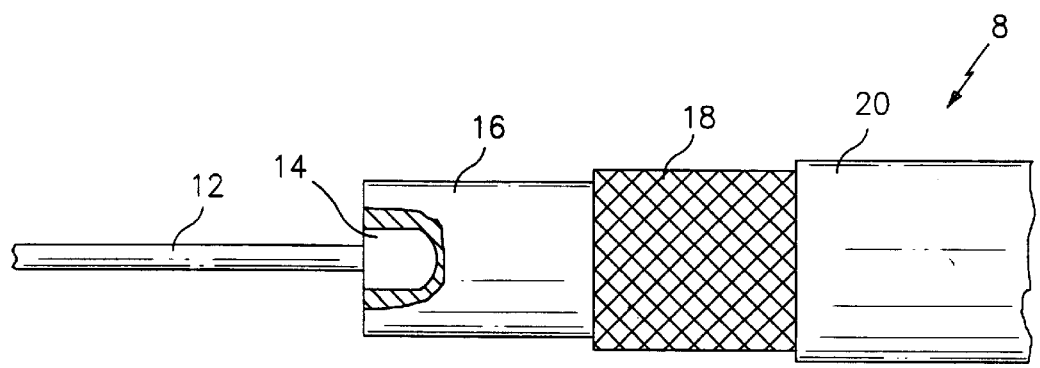
FIG. 2 depicts an end of a fiber optic cable which has been stripped in accordance with a first manufacturing step in the fabrication of the fiber optic terminus.

In FIG. 2, the fiber optic cable 8 is stripped to remove and expose several sheaths of cable material. Describing the fiber optic cable 8 from its innermost element to its outermost sheath, the stripped end of the fiber optic cable 8 comprises a central optical fiber 12, a silicon buffer 14 disposed about the optical fiber 12, an inner jacket 16 enveloping the silicon buffer 14, a strengthening member 18 comprising a braided or woven fiber, e.g., a polyamide fiber such as Kevlar®, wrapped about the inner jacket 16, and an outer jacket 20 enveloping the strengthening member 18. The fiber optic cable 8 may be stripped by hand using a conventional mechanical stripper such as that available from Clauss Inc., located in Freemont, Ohio, or by automated stripping equipment such as that produced by Schleuniger Inc., located in Manchester, N.H. The dimensions for stripping each sheath will vary depending upon the type of terminus being fabricated and, more specifically, upon the dimensions of the ferrule assembly to be bonded to the stripped end of the fiber optic cable 8.

BONDING OPERATION

In FIG. 3, the stripped end of the fiber optic cable 8 is prepared for bonding to a ferrule assembly 22. In the described embodiment, the ferrule assembly 22 includes a rigid ferrule 24 and an aft body or sleeve 26 circumscribing and bonded to an end portion of the ferrule 24. More specifically, the rigid ferrule 24 defines an external face surface 28, a central bore 30 and an internal end 32, and the aft body 26 comprises an cylindrical inner bore 34 and a tapered end 36 defining a cylindrical outer surface 38. In the described embodiment, the ferrule 24 is fabricated from a ceramic such as zirconia, and the aft body 26 is fabricated from stainless steel.

In preparation for bonding, a bead or ring of bonding adhesive 40 is applied to the outer surface 38 of the aft body 26, corresponding to region A, and a layer of bonding adhesive 42, corresponding to region B, is applied to the optical fiber 12 and inner jacket 14. In the broadest sense of the invention, the bonding adhesives 40, 42 in regions A and B are the same and, furthermore, are selected such that the Glass Transition Temperature ($T_G$) is greater than the maximum temperature anticipated in the operating environment of the terminus 10. In the described embodiment, the bonding adhesive is a thermosetting epoxy having a $T_G$ of greater than about 125° C. which represents the maximum temperature anticipated in aerospace applications. A suitable thermosetting epoxy is available from EPOXY TECHNOLOGY, INC. located in Billerica, Mass. under the tradename EPO-TEK 353ND. Furthermore, prior to bonding, the strengthening member 18 is folded rearwardly over the outer jacket 20. In the preferred embodiment, a shrink tubing 44, which will subsequently overlay the strengthening member 18, is used to temporarily preposition the strengthening member 18 over the outer jacket 20.

In FIG. 4, the stripped end of the fiber optic cable 8 is inserted within the ferrule assembly 22 such that the optical fiber 12 passes through the ferrule bore 30 and the inner jacket 14 abuts the internal end 32 of the ferrule 24. Next, the shrink tubing 44 is slid rearwardly (shown in phantom) to release the strengthening member 18 which is then folded over the cylindrical outer surface 38 of the aft body 26. As such, the ring of bonding adhesive 40 in region A contacts and impregnates the strengthening member 18. The shrink tubing 44 is then transpositioned such that it overlays the strengthening member 18 and the outer jacket 20 of the fiber optic cable 8.

Upon positioning the shrink tubing 44, the area corresponding to the bead of bonding adhesive 40 in region A is exposed to a temperature suitable to solidify the adhesive 40. In the context used herein, the term solidify means that the adhesive is either fully or partially cured and has achieved at least about 20% of its strength properties. In the described embodiment, a heat gun (not shown) is used to elevate the temperature of the bonding adhesive 40 to between about 175° C. to about 250° C. for a period of less than about 5 minutes. In addition to solidifying the bonding adhesive 40, the shrink tubing 44 contracts so as to effect an improved bond between the strengthening member 18 and the ferrule assembly 22 and, furthermore, grip the outer jacket 20 of the fiber optic cable 8. Moreover, the shrink tubing 44 provides a degree of strain relief between the ferrule assembly 22 and the fiber optic cable 8. A suitable shrink tubing 44 may be fabricated from a chlorinated polyolefin material and is available from Raychem Corporation located in Fremont, Calif. under the tradename Thermofit NTFR Sumitube R10.

The partially bonded assembly is then placed into an oven to fully cure or cross-link the bonding adhesive 42 in region B between the ferrule 24 and the optical fiber 12 and, if necessary, the bonding adhesive 40 between the strengthening member 18 and the aft body 26. Preferably, the assembly is exposed to a multi-stage cure cycle or a "stepped-cure" to fully cure or cross-link the bonding adhesive in regions A and/or B. In the broadest sense of the invention, the bonding adhesive 42 is: exposed to a first low dwell temperature for a prolonged period to permit the bonding adhesive to set or stabilize, subsequently exposed to several successively higher intermediate dwell temperatures, and lastly, permitted to cool down to a final low dwell temperature. In the preferred embodiment, the first and final low dwell temperatures are about room temperature or between about 22° C. to about 28° C. Furthermore, in the context used herein, the "setting" or "stabilizing" of the adhesive means that the adhesive has achieved greater than about 50% of its final strength properties.

While the time/temperature cycles may vary depending upon the physical properties of the selected bonding adhesive, the preferred stepped-cure operation comprises five stages as summarized in Table I below.

TABLE I

| Cure Stage | Temperature (degrees C.) | Dwell Time (Minutes) |
|---|---|---|
| First | 25 ± 10 | 120–240 |
| Second | 80 ± 10 | 60 ± 5 |
| Third | 120 ± 10 | 60 ± 5 |
| Fourth | 150 ± 10 | 60 ± 5 |
| Fifth (Cool Down) | 25 ± 10 | 60 (minimum) |

The above-described bonding operation offers several advantages which heretofore have not been addressed/recognized. Firstly, by solidifying the bonding adhesive 40 about the aft end of the ferrule assembly 22, the assembly is stabilized for subsequent handling, i.e., before being placed in a curing oven. Secondly, the solidified adhesive 40 in region A provides a damming effect which prevents "wicking" of adhesive 42 in region B into the strengthening member 18. That is, the inventors discovered, in prior unsuccessful bonding attempts, that upon liquification of the adhesive in the terminus, i.e., when elevated temperatures caused the adhesive to "flow", the braided fibers of the strengthening member 18 would tend to wick the adhesive from the interior of the ferrule assembly 22. As such, the wicking action depleted the bonding adhesive from the areas most critical to the bonding operation, i.e., between the ferrule 24 and the optical fiber 12.

Finally, the stepped-cure operation reduces the residual stresses in the optical fiber 12 and maximizes the strength of the bonding adhesive. With respect to the former, the inventors discovered that when applying a conventional cure cycle, i.e., elevating the temperature of the adhesive to one temperature for a prolonged period of time, the bonding adhesive cross-links when the differential in thermal expansion between the optical fiber and the ferrule is greatest. As such, when the fiber and ferrule cool, residual tensile stresses are placed in the optical fiber which may accelerate the propagation of a crack in the optical fiber. In contrast, the stepped-cure operation permits the bonding adhesive 42 in region B to dwell at a low temperature for a prolonged period, i.e., between 1 and 2 hours, to partially set before being exposed to yet higher temperatures. As such, while the differential in thermal expansion may introduce a transient compressive stress in the optical fiber 12 during the manufacturing process, when cooled, the optical fiber 12 is substantially unloaded. With respect to the latter, the inventors discovered that when applying a conventional cure cycle, i.e., elevating the temperature of the adhesive to one temperature for a prolonged period of time, the Glass Transition Temperature of the adhesive may not reach or exceed the maximum anticipated temperature of its intended operating environment. While for many applications this may be an infrequently-encountered, tolerable transient condition, such resultant physical properties of the adhesive may cause "pistoning" of the optical fiber 12 relative to the ferrule 24. As such, in use, the position of optical fiber 12 may extend beyond the ferrule 24, which, as will be discussed hereinafter, is unacceptable for a fiber optic terminus in a demanding operational environment.

CLEAVING AND POLISHING OPERATION

Once the fiber optic cable 8 and ferrule assembly 22 have been fully-cured, the end of the optical fiber 12 is cleaved in close proximity to the external face surface 28 of the ferrule 24. More specifically, the optical fiber 12 is scored/scribed to create a stress concentration point, and pulled under tension to cleave the optical fiber 12. The cleaving operation should break the optical fiber 12 as close as practicable to the external face surface 28, and preferably, within about 0.0254 cm. thereof. Alternatively, the cleaving operation may be rendered moot depending upon the accuracy of the previously-described stripping operation. That is, for example, when using a highly precise automated stripper, the silicone buffer 14 (see FIG. 2) and inner jacket 16 may be removed so as to effect the precise optical fiber length needed, i.e., the length required for the optical fiber 12 to protrude a small amount beyond the external face surface 28 of the ferrule 24.

The polishing operation comprises the use of various sanding materials (hereinafter referred to as polishing films) to produce a preferred terminus end profile. Before discussing the polishing operation in detail, it is useful to define the geometry of the resultant end profile and the advantages thereof. More specifically, and referring to FIGS. 5, 5a and 5b, the preferred end profile 50 is characterized by the optical fiber 12 defining an end surface 52 which is recessed or undercut relative to the face surface 28 of the ferrule 24 (best shown in FIG. 5a). As used herein, the term "end surface" of the optical fiber means at least the combination of the light-carrying core $12_{CO}$ and its surrounding cladding $12_{CL}$.

Figure 5B:
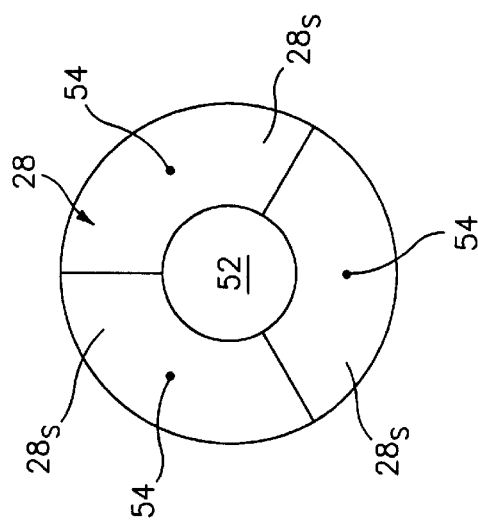
Figure 5A:
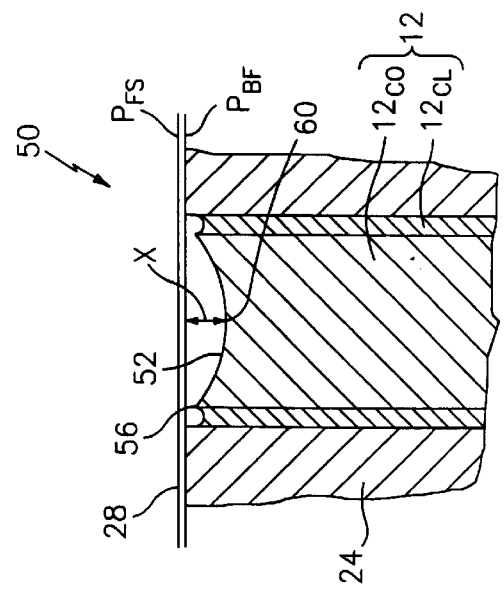
FIG. 5a depicts an enlarged view of FIG. 5 for illustrating the end surface of the optical fiber and a maximum acceptable undercut relative to a theoretical plane.
Figure 5:
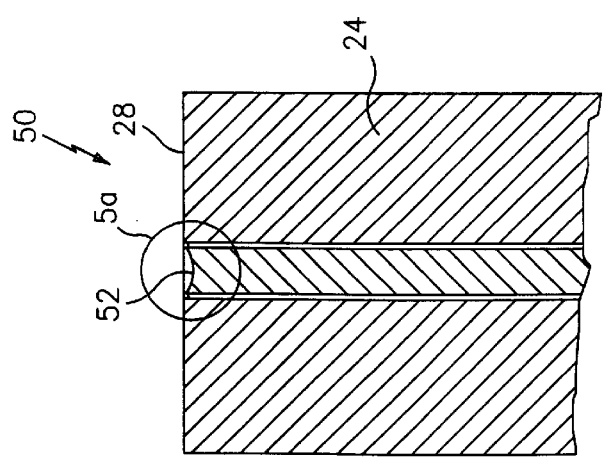
FIG. 5 depicts a preferred terminus end profile subsequent to a polishing operation wherein the end surface of the optical fiber is undercut relative to a face surface of the ferrule assembly.

In the broadest interpretation of the invention, the external face surface 28 defines a first theoretical plane $P_{FS}$ in three dimensional space, which plane $P_{FS}$ intersects at least three apexes on the face surface 28. Referring to FIGS. 5a and 5b, an apex 54 (not shown in FIG. 5a) may be selected from within each of three 120 degree sectors $28_S$ of the face surface 28. In relationship to the plane $P_{FS}$, all points on the end surface 52 of the optical fiber 12 lie below the plane $P_{FS}$, or stated another way, no point on the end surface 52 intersects the plane $P_{FS}$. In the preferred embodiment, a second theoretical plane $P_{BF}$ is defined by a best fit curve, e.g., least squares fit, of the data points associated with the face surface 28. In this embodiment, it is desirable that the highest point or apex 56 of the end surface 52 lies below the second planar boundary $P_{BF}$. Moreover, in this embodiment, it is desirable to ensure that the lowest point 60 or nadir of the end surface 52 defines a distance X which is within a range of about 0.01 micrometers to about 10.0 micrometers from the plane $P_{BF}$, and, more preferably, within a range of about 0.5 micrometers to about 1.0 micrometers therefrom. In the most preferred embodiment, the apex 56 of the end surface 52 lies below or is mathematically less than the lowest point or nadir (not depicted) of the face surface 28. As such, in operation, i.e., when a pair of opposed termini are assembled, the optical fiber 12 of one terminus 10 will not touch or contact any surface, e.g., the optical fiber or ferrule of an opposed terminus.

The inventors discovered that such non-contacting relationship is critical when adapting fiber optic termini for use in a demanding operational environment. Heretofore, fiber optic termini were fabricated so as to produce a protruding rounded or, alternatively, planar end profile wherein physical contact between the optical fibers is desirable. For example, in the telecommunications industry, the end profile is characterized by a rounded end which protrudes slightly with respect to the face surface of the ferrule. When assembled, the optical fibers are in physical contact which ensures the efficacy of the light transmission. While such relationship can enhance the quality of the spectral transmission, physical contact can promote cracks and imperfections, especially when subject to a demanding environment. As mentioned in the Background of the Invention, even minor imperfections can degrade or entirely defeat the transmission of light.

Figure 6:
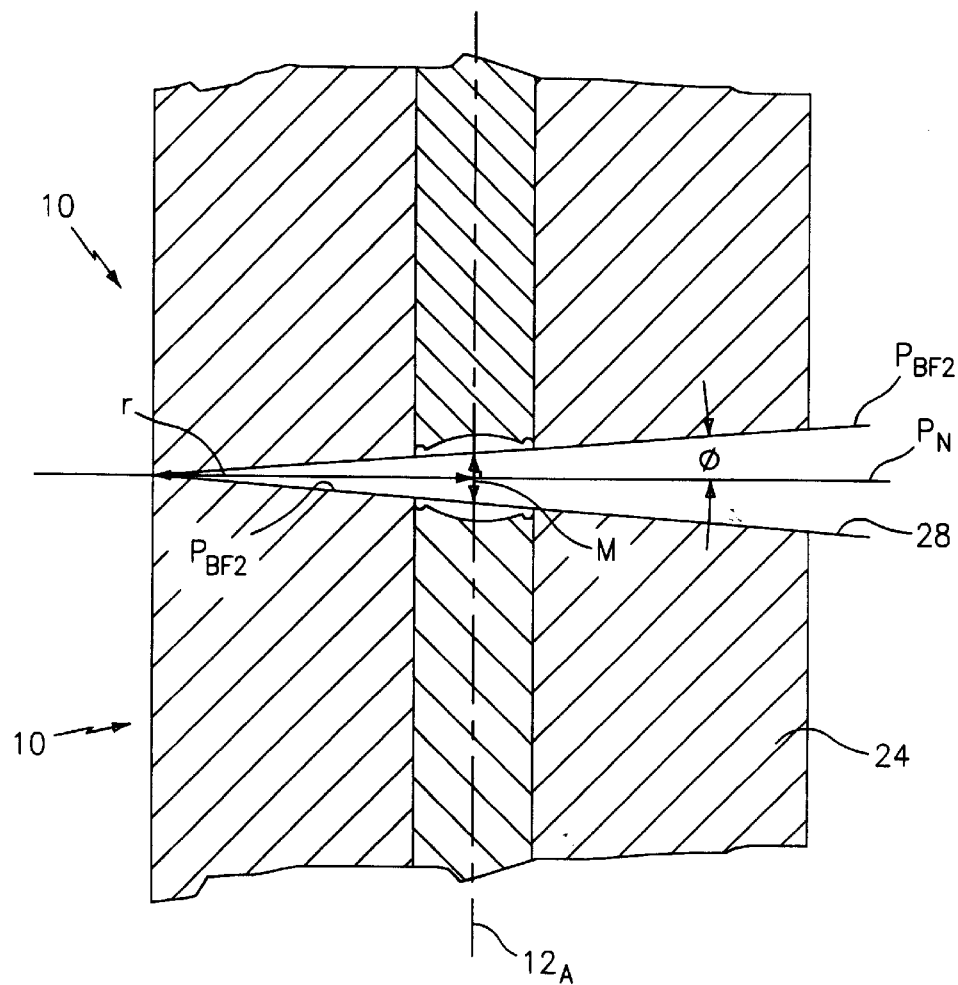
FIG. 6 depicts termini according to the present invention disposed in opposed relation for illustrating an alternate embodiment of the invention wherein a maximum acceptable surface angle is defined for minimizing transmission losses.

For applications wherein the loss of transmission at each fiber optic connection is highly critical, the inventors discovered that the surface angle of the ferrule is also an important factor. In FIG. 6, the face surface 28 of the ferrule 24 should define a low angle relative to a plane $P_N$ normal to the longitudinal axis $12_A$ of the optical fiber 12. In accordance with this embodiment of the invention, the face surface 28 defines a theoretical plane $P_{BF}2$ generated by a best fit curve, e.g., a least squares fit, of the profile data points. Preferably, the plane $P_{BF2}$ defines a surface angle $\phi$ relative to the plane $P_N$ where the surface angle $\phi$ is a function of a desired maximum separation distance between two abutting termini 10 and the radius of the ferrule 24. The following expression may be used to calculate the surface angle $\phi$.

$$\phi = \text{Tan}^{-1}(M/2r)$$

wherein M is the maximum separation distance between opposed termini 10; and wherein r is the radius r of the ferrule 24.

In the preferred embodiment of the invention, to achieve the loss levels typically required in the aerospace industry, the maximum separation distance M is typically less than about 30 microns, and, more preferably, less than about 10 microns and best at zero microns. For example, when employing the above expression and criteria, a ferrule having a radius of about 0.0794 cm will, preferably, define a surface angle of less than about 2.0 degrees and, more preferably, less than about 0.5 degrees and best at zero degrees. Accordingly, by maintaining a threshold surface angle $\phi$, the gap and degree of light refraction between assembled termini 10 are minimized so as to mitigate light losses thereacross.

Returning to our discussion of the manufacturing process, the polishing operation comprises the use of hard and soft polishing films having a select particulate size, e.g., course, intermediate, and fine, to produce the preferred terminus end profile described above. In the broadest sense of the invention, the method involves a first step of polishing the ferrule and optical fiber utilizing a course polishing film comprising a relatively soft polishing material. In the context used herein, "course" means that the particulate or grit size of the polishing film is greater than about 5 microns, and the term "soft" polishing material means that the particulate material has a hardness of about eight (8) to about thirty-five (35) on a Knoop Hardness scale. A second step comprises polishing the ferrule and optical 30 fiber utilizing a "fine" polishing film having a relatively hard polishing material. In the context used herein, "fine" means that the particulate or grit size is greater than about 0.1 microns, and the term "hard" polishing material means that the particulate material has a hardness of about forty-five (45) to about one hundred and five (105) on a Knoop Hardness Scale. A final step in the polishing process involves polishing the ferrule and optical fiber utilizing an "ultra-fine" polishing film having a relatively soft polishing material. In the context used herein, an "ultra-fine" means that the particulate or grit size of the polishing film is greater than about 0.001 microns. In the preferred embodiment, the course polishing film has a grit size greater than about 10 microns, the fine polishing film has a grit size greater than about 0.3 microns, and the ultra-fine polishing film has a grit size greater than about 0.05 microns. Furthermore, in the preferred embodiment, the soft polishing material is Aluminum Oxide having a Knoop Hardness of between about thirteen (13) to about twenty-one (21), and the hard polishing material is Diamond having a Knoop Hardness of between about fifty-six (56) to about one hundred and two (102).

Figure 7:
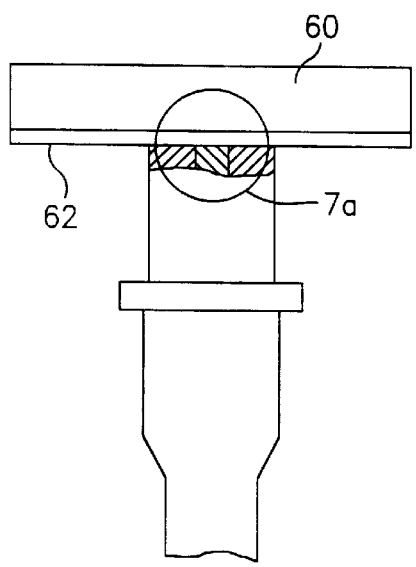
FIG. 7 is a simplified view of a polishing film having a rigid support or backing for producing the desired undercut terminus end profile according to the present invention.
Figure 7A:
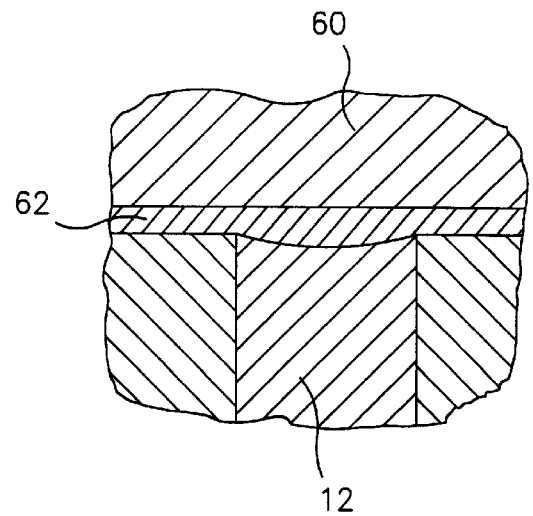
FIG. 7a is an enlarged view of FIG. 7 for illustrating the function of the rigid support.

These polishing steps produce the preferred undercut terminus end profile. In addition to the use of select polishing films, the inventors discovered that the undercut end profile is best achieved by rigidly backing the polishing films. Heretofore, the polishing films for fabricating prior art fiber optic termini were supported by a compliant substructure or backing to produce the desired protruding/rounded end configuration. In FIGS. 7 and 7a, the terminus end profile of the present invention is produced by providing a rigid backing 60 to support the each of the various polishing films 62. As such, under applied pressure, the polishing films 62 deform into the softer optical fiber 12 to produce the desired undercut configuration.

While the polishing operation described above comprises at least three steps, it will be appreciated that additional intermediate polishing steps may be desired to ameliorate the efficacy of the end profile. Furthermore, the polishing operation may be performed by hand, machine or a combination thereof. Table II below itemizes an exemplary polishing operation in accordance with the teachings of the present invention.

| Polishing Step | Time (sec) | Pressure (gm/mm$^2$) | Polish Grit (microns) | Polish Material |
|---|---|---|---|---|
| Hand Polish | As Required | Operator | 15 | Alum. Oxide |
| Fixture Hand Polish | 10–30 | Operator | 15 | Alum. Oxide |
| Machine Polish | 120 | 25–150 | 10 | Alum. Oxide |
| Machine Polish | 120 | 25–150 | 3 | Diamond |
| Machine Polish | 90 | 50–305 | 0.3 | Diamond |

-continued

| Polishing Step | Time (sec) | Pressure (gm/mm$^2$) | Polish Grit (microns) | Polish Material |
|---|---|---|---|---|
| Machine Polish | 120 | 100–610 | 0.05 | Alum. Oxide |

INSPECTION AND ACCEPTANCE OPERATION

Upon completion of the polishing operation, the terminus end profile is inspected to reveal imperfections and verify that the previously-described undercut and/or surface angle is achieved. Such inspection is performed by a combination of microscopic visual inspection and by an incident-light interference device (interferometer). In the preferred embodiment, a high-power microscope e.g., 500 power enlargement, is employed to examine for imperfections, e.g., cracks, which may impede the transmission of light. Generally, any visible crack in the light carrying core $12_{CO}$ (see FIG. 5a) of the optical fiber 12 is unacceptable and results in rejection of the terminus 10.

Figure 10:
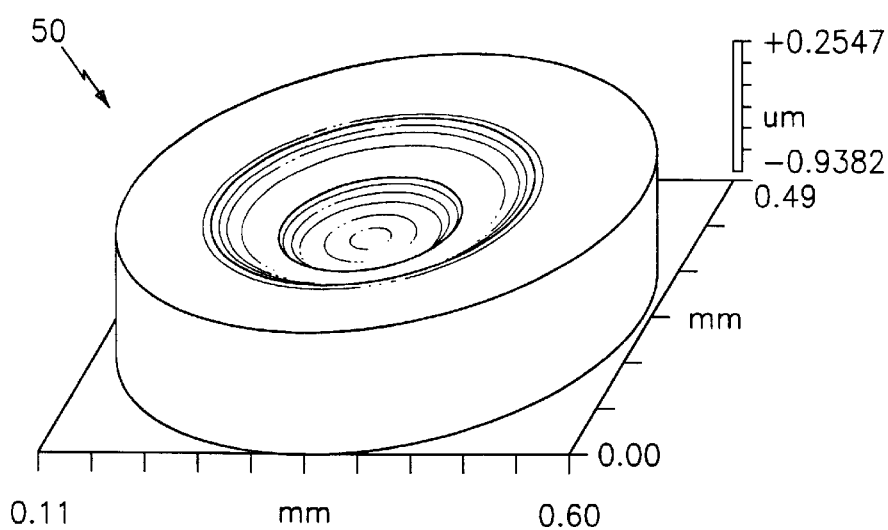
FIG. 10 is a three-dimensional representation of the terminus end profile which is produced by the interferometer.
Figure 9:
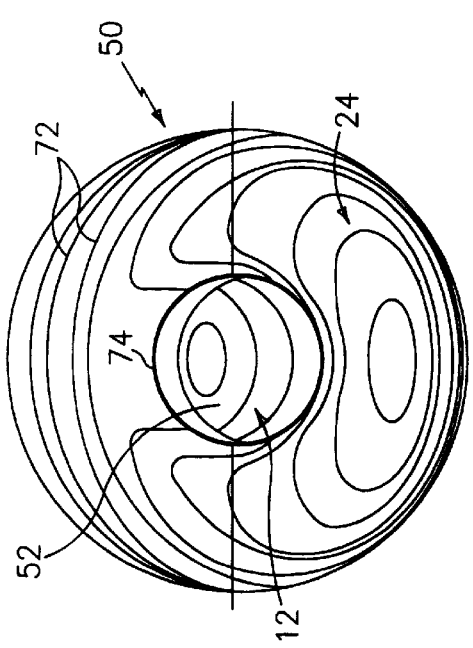
FIG. 9 depicts a two-dimensional fringe pattern generated by the interferometer, which fringe pattern is indicative of the topography of the terminus end profile.
Figure 8:
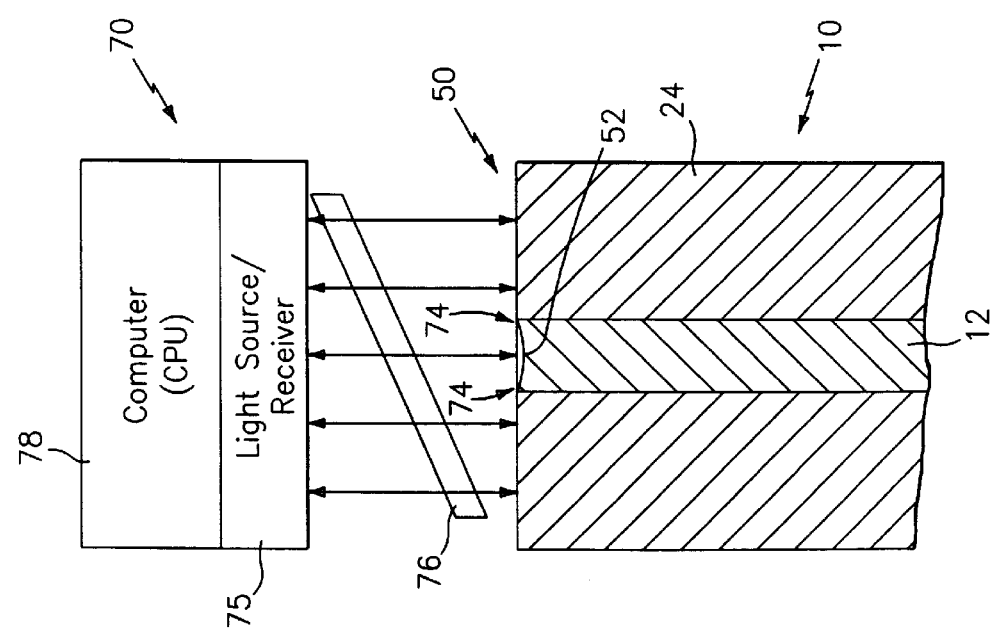
FIG. 8 depicts an interferometer (Michelson-type) used to inspect the topography of the resultant terminus end profile subsequent to the polishing operation.

Referring to FIGS. 8 and 9, once it has been determined that the optical fiber 12 is free of imperfections, a red- or white-light interferometer 70 is used to verify the undercut and/or the surface angle of the terminus end profile. An interferometer is typically used to develop a pattern of fringes 72 (see FIG. 9) representative of the geometry of the terminus end profile. A red-light interferometer uses a single wave-length of light to form a single series of interference fringes. While a red-light interferometer can be used, one drawback thereto relates to its inability to detect step changes in height like those which can be found at the boundary between the edges of the ferrule 24 and the optical fiber 12. Consequently, additional analysis must be performed to determine that the fringe pattern 72 is indicative of a recess as compared with a protrusion of the end face 52. A white light interferometer, on the other hand, obtains much more information about surface structure and can detect step changes in height inasmuch as it examines several discreet interference bands within the white light spectrum. FIG. 10 depicts the output of an interferometer which can be mathematically manipulated to generate a 3-dimensional image of the terminus end profile 50.

Figure 11:
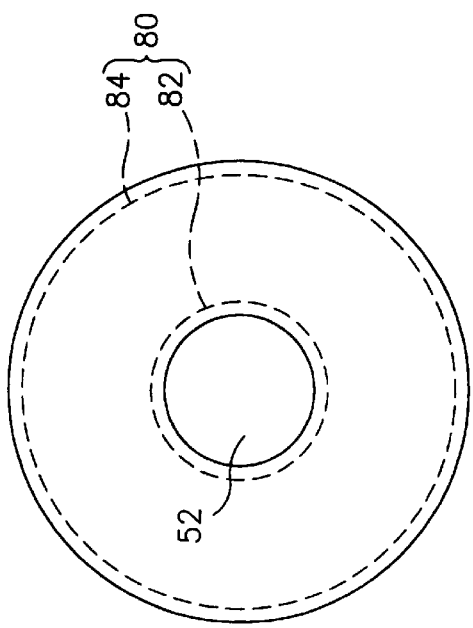
FIG. 11 depicts electronic masks projected upon the terminus end profile for interpreting the topography thereof and for simplifying the complexity of computer calculations used to compare the topography against predefined acceptance criteria.

To perform this operation, and referring to FIGS. 8 and 11, a calibrated V-block (not shown) holds the terminus 10 in fixed relation to the white light interferometer, shown schematically above the terminus 10 in FIG. 8. A light source 75 projects white light onto the terminus end profile 50 through a splitter 76 (i.e., partial transmission mirror). The light is reflected to a receiver (shown as an integral unit with the light source 75) and interpreted via a computer processing unit 78. A computer software routine is run internally of the computer processing unit 78 to delineate areas corresponding to the end face 52 of the optical fiber 12 and the face surface 28 of the ferrule assembly 24. More specifically, electronic fields-of-view 80 (see FIG. 11) are generated to examine regions of the terminus end profile 50 to acquire topographical data. For example, a circular field-of-view 82 corresponding to the end surface 52 of the optical fiber 12 is generated for the purpose of obtaining topographical data in this area. Alternatively, an annular field of view 84 is generated to examine the face surface 28 exclusive of the center and peripheral portions of the terminus end profile 50. The computer algorithms for generating electronic masks of the type described, i.e., for differentiating the surface characteristics of one region relative to another, is well-known in the art and will not be described in detail herein. Suffice to say that these electronic fields-of-view 80 are generated to collect the most relevant topographical information in a specific region.

Once the relevant information has been obtained, the interferometer performs straight-forward calculations to determine the undercut and/or surface angle of the end profile. More specifically, the interferometer may first determine whether any point on the end surface intersects a theoretical plane, i.e., the plane $P_{FS}$ or the plane $P_{BF}$ (FIGS. 5*a* and 6) discussed in preceding paragraphs. Furthermore, it may perform a mathematical determination that the highest point on the end face is below the lowest point on the face surface. Moreover, a measurement of the maximum undercut depth X (FIG. 5*a*) will be determined. Yet other calculations may include a determination of the surface angle ϕ (FIG. 6) of the end profile.

Although the invention has been shown and described with respect to exemplary embodiments thereof, it should be understood by those skilled in the art that other changes, omissions and additions may be made therein and thereto, without departing from the spirit and scope of the present invention.

What is claimed is:

1. A fiber optic terminus (10) for use in fiber optic cable connections, said fiber optic terminus (10) including an optical fiber (12) disposed within and supported by a ferrule (24), said fiber optic terminus (10) being characterized by:
    a terminus end profile (50) having a face surface (28) defined by the ferrule (24), and an end surface (52) defined by the optical fiber (12), said face surface (28) defining a theoretical plane ($P_{FS}$ or $P_{BF}$), and said end surface (52) defining an apex point (56), said apex point (56) lying below said theoretical plane ($P_{FS}$ or $P_{BF}$).

2. The fiber optic terminus (10) according to claim 1 wherein said face surface (28) of said ferrule (24) defines a plurality of data points, and said theoretical plane ($P_{BF}$) is defined by a best fit curve of said data points.

3. The fiber optic terminus (10) according to claim 2 wherein said end surface (52) of said optical fiber (12) defines a nadir (60) which is a distance X from said theoretical plane $P_{BF}$, said distance X being within a range of between about 0.01 micrometers to about 10.0 micrometers.

4. The fiber optic terminus (10) according to claim 1 wherein said face surface (28) of said ferrule (24) defines a nadir and said end surface (52) of said optical fiber (12) defines an apex, said apex of said end surface (52) lying below said nadir of said face surface (28).

5. The fiber optic terminus (10) according to claim 4 wherein said distance X is within a range of about 0.5 micrometers to about 1.0 micrometers.

6. The fiber optic terminus (10) according to claim 1
    wherein said face surface (28) of said ferrule (24) defines a plurality of data points, said theoretical plane ($P_{BF}$) being defined by a best fit curve of said data points,
    wherein said face surface (28) of said ferrule (24) defines a nadir, and said end surface (52) of said optical fiber (12) defines an apex, said apex of said end surface (52) lying below said nadir of said face surface (28), and
    wherein said end surface (52) of said optical fiber (12) defines a nadir (60) which is a distance X from said theoretical plane $P_{BF}$, said distance X being within a range of about 0.01 micrometers to about 10.0 micrometers.

7. The fiber optic terminus (10) according to claim 6 wherein said distance X is within a range of about 0.5 micrometers to about 1.0 micrometers.

8. The fiber optic terminus (10) according to claim 1 wherein said theoretical plane ($P_{FS}$) is defined by the intersection of at least three apexes on said face surface (28) of the ferrule (24).

9. The fiber optic terminus (10) according to claim 1 wherein said optical fiber (12) defines a longitudinal axis (12$_A$) and wherein said face surface (28) of said ferrule (24) defines a surface angle ϕ relative to a plane $P_n$ normal to said longitudinal axis (12$_A$), said surface angle ϕ being less than about 2.0 degrees.

10. The fiber optic terminus (10) according to claim 1 wherein said optical fiber (12) defines a longitudinal axis (12$_A$) and wherein said face surface (28) of said ferrule (24) defines a surface angle ϕ relative to a plane $P_N$ normal to said longitudinal axis (12$_A$), said surface angle ϕ being less than about 0.5 degrees.

11. A fiber optic connection having a pair of opposed fiber optic terminus, each said fiber optic terminus (10) including an optical fiber (12) disposed within and supported by a ferrule (24), said fiber optic connection defining a maximum separation distance M, and said fiber optic terminus defining a radius r, said fiber optic connection being characterized by:
    each of said fiber optic terminus (10) having a terminus end profile (50)
    said terminus end profile (50) having a face surface (28) defined by the ferrule (24), and an end surface (52) defined by the optical fiber (12),
    said face surface (28) defining a theoretical plane ($P_{FS}$ or $P_{BF}$), and a surface angle ϕ relative to a theoretical plane $P_N$ normal to a longitudinal axis (12$_A$) of the optical fiber 12,
    said end surface (52) defining an apex point (56),
    said apex point (56) lying below said theoretical plane ($P_{FS}$ or $P_{BF}$); and
    said surface angle ϕ being a defined by the function:

$$\phi = \mathrm{Tan}^{-1}(M/2r)$$

12. The fiber optic connection according to claim 11 wherein said face surface (28) of said ferrule (24) defines a plurality of data points, and said theoretical plane ($P_{BF}$) is defined by a best fit curve of said data points.

13. The fiber optic connection according to claim 12 wherein said end surface (52) of said optical fiber (12) defines a nadir (60) which is a distance X from said theoretical plane $P_{BF}$, said distance X being within a range of about 0.01 micrometers to about 10.0 micrometers.

14. The fiber optic connection according to claim 11 wherein said face surface (28) of said ferrule (24) defines a nadir and said end surface (52) of said optical fiber (12) defines an apex, said apex of said end surface (52) lying below said nadir of said face surface (28).

15. The fiber optic connection according to claim 14 wherein said distance X is within a range of about 0.5 micrometers to about 1.0 micrometers.

16. The fiber optic connection according to claim 11
    wherein said face surface (28) of said ferrule (24) defines a plurality of data points, said theoretical plane ($P_{BF}$) being defined by a best fit curve of said data points,
    wherein said face surface (28) of said ferrule (24) defines a nadir, and said end surface (52) of said optical fiber (12) defines an apex, said apex of said end surface (52) lying below said nadir of said face surface (28), and wherein said end surface (52) of said optical fiber (12) defines a nadir (60) which is a distance X from said theoretical plane $P_{BF}$, said distance X being within a range of about 0.01 micrometers to about 10.0 micrometers.

17. The fiber optic connection according to claim 16 wherein said distance X is within a range of about 0.5 micrometers to about 1.0 micrometers.

18. The fiber optic connection according to claim 11 wherein said theoretical plane ($P_{FS}$) is defined by the intersection of at least three apexes on said face surface (28) of the ferrule (24).

19. The fiber optic connection according to claim 11 wherein said maximum separation distance M is less than about 30 microns.

20. The fiber optic connection according to claim 11 wherein said maximum separation distance M is less than about 10 microns.

21. A method for manufacturing a fiber optic terminus (10) for use in fiber optic cable connectors, said fiber optic terminus (10) including an optical fiber (12) disposed within and supported by a ferrule (24), said method including the steps of stripping a fiber optic cable (8) to expose the optical fiber (12);

bonding the stripped-end of the fiber optic cable (8) to a ferrule (24);

cleaving said optical fiber (12) in close proximity to a face surface (28) of said ferrule (24);

polishing said cleaved-end of said optical fiber (12) to achieve a terminus end profile; and inspecting said polished-end of said optical fiber (12) to determine whether said terminus end profile conforms to predefined acceptance criteria;

said polishing step being characterized by:

polishing the ferrule (24) and optical fiber (12) utilizing a course polishing film comprising a soft polishing material, said course polishing film having a grit size greater than about 5 microns;

polishing the ferrule (24) and optical fiber (12) utilizing a fine polishing film having a hard polishing material, said fine polishing film having a grit size greater than about 0.1 microns; and polishing the ferrule (24) and optical fiber (12) utilizing an ultra-fine polishing film having a soft polishing material, said ultra-fine polishing film having a grit size greater than about 0.001 microns, said soft polishing material having a hardness of about 8.0 to about 35.0 on a Knoop Hardness Scale, and said hard polishing material having a hardness of about 45.0 to about 105.0 on a Knoop Hardness Scale, whereby said polishing step produces a termini end profile (50) wherein an end surface (52) of said optical fiber (12) is recessed relative to the face surface (28) of said ferrule (24).

22. The method according to claim 21 wherein said course polishing film has a grit size greater than about 10 microns, wherein said fine polishing film has grit size greater than about 0.3 microns, and wherein said ultra-fine polishing film has a grit size greater than about 0.05 microns.

23. The method according to claim 22 wherein said soft polishing material has a hardness of between about 13.0 to about 21.0 on a Knoop Hardness Scale, and wherein said hard polishing material has a hardness of between about 56.0 to about 102.0 on a Knoop Hardness Scale.

24. The method according to claim 22 wherein said polishing films (62) are backed by a rigid substructure (60) during the polishing operation to produce the terminus end profile (50).

25. The method according to claim 21 wherein said soft polishing material has a hardness of between about 13.0 to about 21.0 on a Knoop Hardness Scale, and wherein said hard polishing material has a hardness of between about 56.0 to about 102.0 on a Knoop Hardness Scale.

26. The method according to claim 25 wherein said polishing films (62) are backed by a rigid substructure (60) during the polishing operation to produce the terminus end profile (50).

27. The method according to claim 21 wherein said polishing films (62) are backed by a rigid substructure (60) during the polishing operation to produce the terminus end profile (50).

28. A method for manufacturing a fiber optic terminus (10) for use in fiber optic cable connectors, said fiber optic terminus (10) including an optical fiber (12) disposed within and supported by a ferrule (24), said method including the steps of stripping a fiber optic cable (8) to expose the optical fiber (12);

bonding the stripped-end of the fiber optic cable (8) to a ferrule (24);

cleaving said optical fiber (12) in close proximity to a face surface (28) of said ferrule (24);

polishing said cleaved-end of said optical fiber (12) to achieve a terminus end profile; and inspecting said polished-end of said optical fiber (12) to determine whether said terminus end profile conforms to predefined acceptance criteria;

said inspection step being characterized by:

examining said terminus end profile (50) using a microscope to detect imperfections in the optical fiber (12), and examining the terminus end profile (50) using an incident-light interference device (70).

29. The method according to claim 28 wherein said incident-light interference device (70) is a white-light interferometer.

30. The method according to claim 28 wherein said step of examining the terminus end profile (50) using an incident-light interference device (70) is further characterized by generating electronic fields-of-view (80) on the terminus end profile (50) to obtain topographical information with respect to an end surface (52) of the optical fiber (12) and with respect to the face surface (28) of the ferrule (24).

* * * * *